UNITED STATES PATENT OFFICE 2,420,749

TREATMENT OF MONOCYCLIC OLEFINIC HYDROCARBONS

Vladimir N. Ipatieff and Herman Pines, Chicago, Ill., assignors to Universal Oil Products Company, Chicago, Ill., a corporation of Delaware No Drawing. Application April 28, 1945, Serial No. 590,959

6 Claims. (Cl. 260—668)

This invention relates to a process for converting monocyclic olefinic hydrocarbons into substantial yields of aromatic hydrocarbons. More particularly, the process relates to the production of alkyl aromatic hydrocarbons by the action of particular catalysts upon monocyclic terpenic hydrocarbons.

An object of this invention is to convert unsaturated cyclic hydrocarbons into a substantial yield of aromatic hydrocarbons.

A further object of this invention is to produce cymene and methyl isopropyl cyclohexene by reacting limonene in the presence of a selected acid-acting catalyst.

One specific embodiment of the present invention relates to a process which comprises reacting a monocyclic olefinic hydrocarbon containing two double bonds per molecule at a temperature of from about 100° to about 400° C. in the presence of a dilute aqueous solution of an acid-acting catalyst.

We have found that hydrogen disproportionation or a transfer occurs when a hydrocarbon selected from the group consisting of a monocyclic terpene and a monocyclic diolefinic hydrocarbon is reacted in the presence of an acid-acting catalyst and particularly a relatively dilute aqueous solution of said acid-acting compound. Thus we observed that limonene when treated with a dilute aqueous solution of magnesium chloride gave substantial yields of p-cymene and dihydrolimonene. This treatment of limonene with magnesium chloride solution caused substantially no polymerization but caused the formation of substantial amounts of the aforementioned p-cymene and dihydrolimonene. Accordingly, the reaction which occurred may be expressed by the following equation:

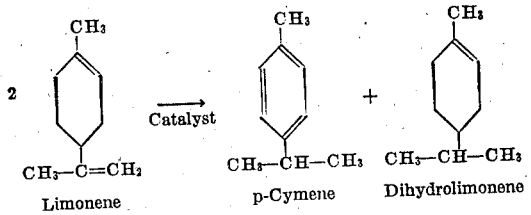

Limonene     p-Cymene     Dihydrolimonene

The type of disproportionation thus observed for limonene occurs also with various other cyclic olefins and particularly with those having at least 2 double bonds per molecule such as terpinene, vinyl cyclohexene, and a mixture of unsaturated cyclic hydrocarbons sometimes referred to as "organic diluent" and recovered from acid-acting catalysts after use in hydrocarbon conversion reactions such as alkylation and polymerization. The reaction forming aromatic hydrocarbons also proceeds more easily with cyclic olefins and monocyclic terpenes in which the cyclic ring contains six carbon atoms.

Catalysts utilizable in the process of our invention are preferably those which do not have pronounced polymerizing properties and comprise essentially an aqueous solution of an acid-acting inorganic compound. The catalysts which we recommend for this reaction are aqueous solutions of acid-acting salts such as ferric chloride, magnesium chloride, aluminum chloride, zinc chloride, sodium acid sulfate, etc., and also dilute aqueous solutions of certain oxygen-containing mineral acids, particularly phosphoric acid and other acids of phosphorus. In general, the catalyst solution utilized in our process contains from about 0.1 to about 5% by weight of the acid-acting salt or mineral acid. The pH of the aqueous solution used as catalyst is preferably less than 4. The type of catalyst to be used depends greatly upon the nature of the compound or compounds submitted to a hydrogen transfer reaction.

The process of this invention is carried out using either batch or continuous operation. When the treatment of the unsaturated hydrocarbon with the catalyst is effected continuously, the used catalyst solution is recovered and recycled to further contact with the hydrocarbon or hydrocarbon mixture being treated. The temperature at which the reaction proceeds is dependent upon the reactants and catalysts employed. Reaction temperatures of from about 100° to about 400° C. are recommended for effecting hydrogen transfer and converting terpenic hydrocarbons into aromatic hydrocarbons but we prefer to use a temperature of from about 150° to about 350° C. for efficient conversion into aromatic hydrocarbons.

The following example is given to illustrate the process of the invention, although with no intention of limiting unduly its generally broad scope.

One molecular proportion of limonene and 5.5 molecular proportions of water containing 0.03 mole of magnesium chloride dissolved therein were placed in an autoclave and heated at 300° C. for 3 hours. During this treatment 20% by weight of the d-limonene was converted into p-cymene.

The foregoing specification and example indicate the character of this process although with

We claim as our invention:

1. A process for producing an aromatic hydrocarbon which comprises reacting a monocyclic diolefinic hydrocarbon containing a ring of 6 carbon atoms in the presence of a dilute aqueous solution containing from about 0.1 to about 5% by weight of an acid-acting catalyst at a temperature of from about 100° to about 400° C.

2. A process for producing an aromatic hydrocarbon which comprises reacting a monocyclic terpenic hydrocarbon in the presence of a dilute aqueous solution containing from about 0.1 to about 5% by weight of an acid-acting catalyst at a temperature of from about 100° to about 400° C.

3. A process for producing p-cymene which comprises reacting limonene at a temperature of from about 150° to about 350° C. in the presence of an aqueous solution containing from about 0.1 to about 5% by weight of an acid-acting catalyst.

4. A process for producing p-cymene which comprises reacting limonene at a temperature of from about 150° to about 350° C. in the presence of an aqueus solution containing from about 0.1 to about 5% by weight of magnesium chloride.

5. A process for producing an aromatic hydrocarbon which comprises reacting a monocyclic diolefinic hydrocarbon containing a ring of 6 carbon atoms in the presence of a dilute aqueous solution containing from about 0.1 to about 5% by weight of an acid-acting catalyst at a temperature of from about 150° to about 350° C.

6. A process for producing an aromatic hydrocarbon which comprises reacting a monocyclic terpenic hydrocarbon in the presence of a dilute aqueous solution containing from about 0.1 to about 5% by weight of an acid-acting catalyst at a temperature of from about 150° to about 350° C.

VLADIMIR N. IPATIEFF.
HERMAN PINES.

REFERENCES CITED

The following references are of record in the file of this patent:

Dupont, Chem. Abs., vol. 27, 2623 (1933). (Pat. Off. Lib.)

Ipatieff et al., Jour. Am. Chem. Soc., vol. 66, 1120–2 (1944). (Pat. Off. Lib.)

Dehn et al., Jour. Am. Chem. Soc., vol. 55, 4284–7 (1933). (Pat. Off. Lib.)